Figure 1:
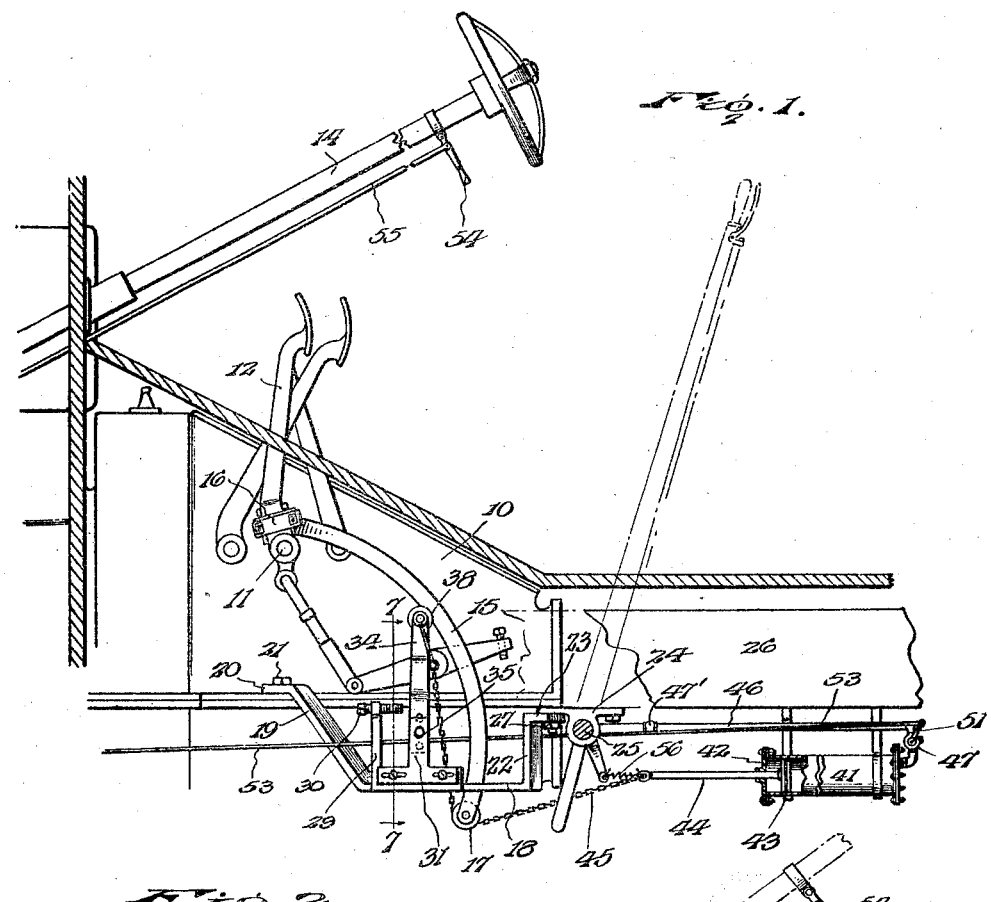

Aug. 25, 1925.  
J. J. MORSCH  
1,550,921  
CLUTCH ACTUATING MECHANISM  
Filed March 12, 1924  2 Sheets-Sheet 1

Inventor  
J. J. Morsch.  
By Lacey & Lacey, Attorneys

Aug. 25, 1925.
J. J. MORSCH
1,550,921
CLUTCH ACTUATING MECHANISM
Filed March 12, 1924    2 Sheets-Sheet 2
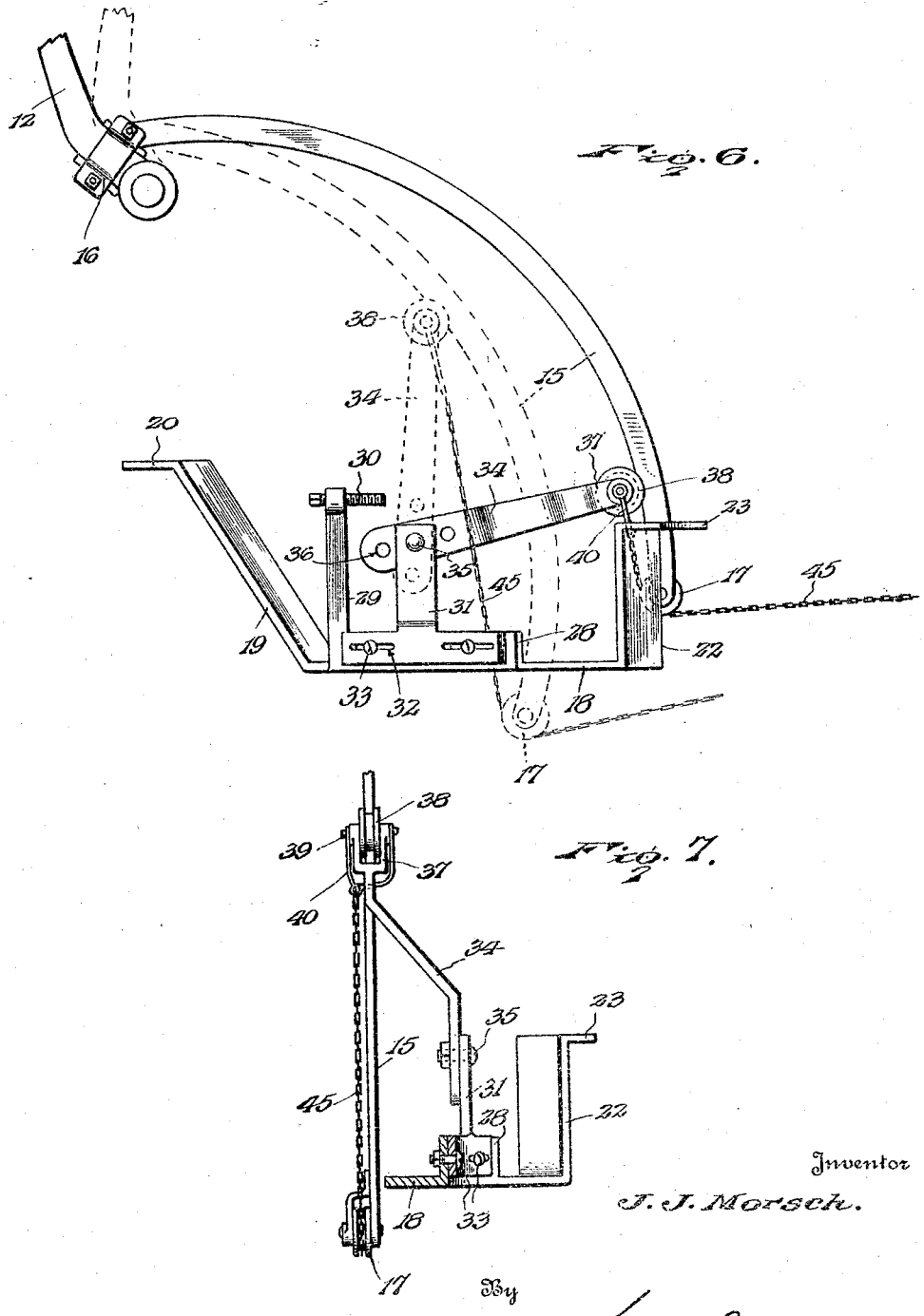
Inventor
J. J. Morsch.
By
Larry Lacey, Attorney, Patented Aug. 25, 1925.

1,550,921

UNITED STATES PATENT OFFICE.

JESSE J. MORSCH, OF DOUGLAS, WYOMING.

CLUTCH-ACTUATING MECHANISM.

Application filed March 12, 1924. Serial No. 698,733.

*To all whom it may concern:*

Be it known that I, JESSE J. MORSCH, a citizen of the United States, residing at Douglas, in the county of Converse and State of Wyoming, have invented certain new and useful Improvements in Clutch-Actuating Mechanism, of which the following is a specification.

This invention relates to an improved clutch actuating mechanism for Ford vehicles and seeks, among other objects, to provide a mechanism which will, with entire efficiency, utilize the suction of the vehicle engine for shifting the clutch pedal of the vehicle to low speed position for rendering the low speed clutch active and which may also be employed for holding the clutch pedal in such position so that the driver of the vehicle may proceed at low speed without the necessity for pressing against the clutch pedal with the foot.

The invention seeks, as a further object, to provide a mechanism employing a suction actuated piston and an arrangement of levers so associated with the clutch pedal that, as the pedal is rocked forwardly, the leverage upon the pedal will be progressively increased so that the limited force of the engine suction as realized upon the piston will thus be entirely sufficient to rock the pedal easily and quickly and rigidly hold the low speed clutch active.

And the invention seeks, as a still further object, to provide a mechanism which may be readily applied without the necessity for any structural change in the vehicle.

Other and incidental objects will appear hereinafter.

Figure 2:
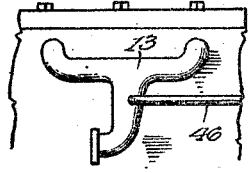
Figure 3:
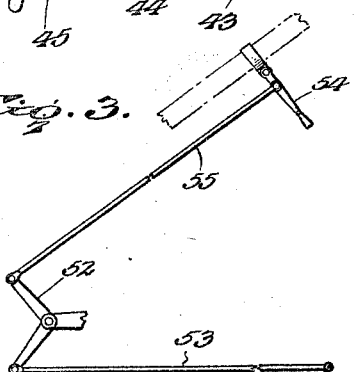
Figure 4:
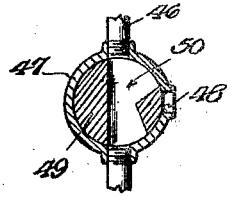
Figure 5:
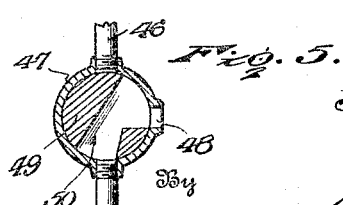

In the drawings:

Figure 1 is a side elevation showing my improved mechanism applied, the vehicle clutch pedal being illustrated in medial neutral position, Figure 2 is a detail elevation showing the manner in which the suction pipe employed is connected to the intake manifold of the vehicle engine, Figure 3 is a detail elevation showing the hand lever and associated parts for controlling the mechanism, Figures 4 and 5 are detail sectional views of the control valve, Figure 6 is a side elevation showing the clutch pedal of the vehicle transmission rocked forwardly, and Figure 7 is a detail sectional view on the line 7—7 of Figure 1, looking in the direction of the arrows.

Referring now more particularly to the drawings, I have, for convenience, shown my improved mechanism in conjunction with the transmission and other parts of a Ford vehicle. The usual transmission cover is indicated at 10, and extending through the cover at one side thereof is a clutch pedal shaft 11 mounting the customary clutch pedal 12. As is well known, the pedal is movable forwardly for rendering the low speed clutch of the vehicle transmission active and is also movable rearwardly to permit active engagement of the high speed clutch of the transmission, forward movement of the pedal serving to disengage the high speed clutch and tightening the low speed clutch band about its drum. The intake manifold of the vehicle engine is indited at 13 and the steering post of the vehicle at 14.

Coming now more particularly to the subject of the present invention, I employ an arcuate lever 15 which is secured to the pedal 12 by a clamp 16 and is arranged to extend downwardly and rearwardly from the pedal while at the free end of said lever is mounted a pulley 17. Mounted in the rear of the plane of the shaft 11 is a substantially U-shaped bracket 18 having a forwardly inclined arm 19 on which is formed a lug 20 overhanging the bottom flange of the cover 10 and extending through said lug, said flange and the abutting flange of the crank case of the engine, is a bolt 21 securing the bracket at its forward end. The bracket is further provided at its rear end with an upstanding arm 22 on which is formed a lug 23 extending, as particularly shown in Figure 1, beneath the forward end of the usual bearing 24 of the controller shaft 25 of the vehicle, and extending through the adjacent side bar of the vehicle chassis, through the bearing and said lug, is a bolt 27 securing the bracket at its rear end. Upstanding from the bracket at its outer edge is a flange 28, at the forward end of which is an upstanding arm 29 mounting a stop screw 30 and mounted upon said flange is an inverted T-shaped bracket plate 31, in the end portions of which are formed slots 32. Freely received through said slots are bolts 33 connecting the plate with the flange 28 for adjustment longitudinally of the flange, and mounted upon the upper end of the plate to coact with the lever 15 is a lever 34. Pivotally connecting the lever 34 with the plate is a bolt 35 and, as will be observed, the lever is provided with spaced openings 36 to selectively receive the bolt so that the lever may be adjusted upon the bracket. As brought out in Figure 7, the lever 34 is offset to extend into the plane of the lever 15 and is formed at its free end with a yoke 37 in which is mounted a grooved roller 38 straddling the forward edge of the lever 15 to bear thereagainst. The roller is journaled upon a bolt 39 and connected with the free end of the lever by said bolt is a shackle 40.

Suitably mounted upon the vehicle chassis in the rear of the bracket 18 is a cylinder 41 provided at its forward end with a vent opening 42 and slidably mounted in the cylinder is a piston 43 from which extends a piston rod 44. Connected at one end to the forward end of said rod is a chain or other suitable flexible element 45 which is trained around the pulley 17 of the lever 15 and attached at its opposite end to the shackle 40 of the lever 34. Extending between the intake manifold 13 of the vehicle engine and the rear end of the cylinder 41 is a pipe 46 in which is interposed a control valve 47 as well as an appropriate check valve 47'. As shown in Figures 4 and 5 of the drawings, the casing of the valve 47 is provided with a vent opening 48 and rotatable in the casing is a valve plug 49 through which is formed a passage 50. This passage is so shaped that, as shown in Figure 4, the valve may be opened to permit flow through the pipe 46, when the vent opening 48 will be closed. On the other hand, when the valve is closed, as shown in Figure 5, communication between the manifold 13 and the cylinder 41 will be cut off while the cylinder will be connected with the vent opening 48. Fixed to the stem of the valve plug is a lever 51 and appropriately mounted near the lower end of the steering post 14 of the vehicle is, as shown in Figure 3, a bell crank 52 connected with said lever by a rod 53. Mounted upon the steering post near its upper end is a pivoted hand lever 54 and extending between said lever and the bell crank is a rod 55. Thus, the lever 54 may be manually rocked for opening and closing the valve. Connected to the piston rod 44 is a spring 56 for drawing the piston 43 forwardly.

In Figure 1 of the drawings, the pedal 12 is shown in medial neutral position. However, when the vehicle is in motion and the high speed clutch of the transmission is active, the pedal 12 is held by the clutch spring in a further rearwardly tilted position. Thus, under the conditions indicated, the lower end of the lever 15 will be rocked slightly further forward from the position shown in Figure 1, while the lever 34 will be moved to abut the stop screw 30, this screw being provided to limit the lever when swung upwardly. Assuming now that the valve 47 is opened, it will be seen that engine suction in the manifold 13 will be communicated to the cylinder 41 for drawing the piston 43 rearwardly. When this occurs, the chain 45 will be drawn across the lower end of the lever 15 while the lever 34 will be rocked downwardly, with the result that an upward and forward thrust will be exerted on the lever 15 acting to swing the pedal 12 forwardly. During the first portion of the travel of the piston, the pedal will thus be moved to neutral position, when the parts will have assumed the relation shown in Figure 1, and, in this connection, it is to be noted that since the lever 34 is swung but slightly forward, the major portion of the travel of the piston 43 is communicated to the lever 15 so that initial forward travel of the pedal 12 will be correspondingly rapid. As the piston 43 continues in its rearward movement, the rapidity of the downward motion of the lever 34 will gradually increase so that the rapidity of the forward movement of the pedal 12 will be correspondingly decreased. However, as the lever 34 swings downwardly, the leverage exerted by said lever on the lever 15 will gradually increase with the result that the vacuum pressure realized in the cylinder 41 against the piston 43 will be amply sufficient to perform the work of swinging the pedal 12 from its neutral position forwardly to low speed position, tightly binding the low speed clutch band about its drum. As the pedal 12 nears the end of its forward throw, the lever 34 will, as shown in Figure 6, approach a horizontal position so that very little vacuum pressure need be maintained in the cylinder 41 for tightly holding the low speed clutch active. However, to prevent possible forward creeping of the piston when the vehicle engine is accelerated, I provide the check valve 47' in the pipe 46. Upon the closing of the valve 47, admitting air to the cylinder 41 and releasing the piston 43, the action of the high speed clutch spring on the pedal 12 will immediately again swing the pedal rearwardly with the result that the spring 56 will pull the piston forwardly while the lever 15 will coact with the roller 38 of the lever 34 for returning the lever 34 upwardly so that the pedal 12 will shift to high speed position.

As is well known, it is necessary, from time to time, to adjust the low speed clutch band in order to take up the wear on the band. This adjustment of the band results in a shortening of the forward throw of the pedal 12. Accordingly, the bracket plate 31 is adjustably mounted on the flange 28 of the bracket 22 while the lever 34 is also adjustably mounted so that said lever may be positioned to accommodate such shortening of the throw of the pedal in order that the downward throw of the lever 34 may be maintained the same irrespective of any shortening or lengthening in the upward throw of the lever 15.

Having thus described the invention, what I claim is:

1. A clutch actuating mechanism including a lever for connection with a clutch pedal, means to coact with said lever for rocking the pedal, and actuating means disposed to act directly on the former means and the lever simultaneously.

2. A clutch actuating mechanism including a lever for connection to a clutch pedal, means to coact with said lever for rocking the pedal, and means for actuating the former means and disposed to coact with the lever for exerting an endwise thrust thereon.

3. A clutch actuating mechanism including a lever for connection to a clutch pedal, a coacting lever pivoted to swing against said first mentioned lever for rocking the pedal, and means for swinging the latter lever and disposed to coact with the former lever for exerting an endwise thrust thereon.

4. A clutch actuating mechanism including an arcuate lever for connection at one end with a clutch pedal, a coacting lever pivoted to swing against the concave face of said first mentioned lever for rocking the pedal, and means for swinging the latter lever and disposed to coincidently act directly on the former lever.

5. A clutch actuating mechanism including a lever for connection with a clutch pedal, a coacting lever pivoted to swing against said first mentioned lever for rocking the pedal, a flexible element arranged to act against said first mentioned lever for rocking the pedal and connected with the latter lever for coincidently swinging such lever, and means for operating said element.

6. A clutch actuating mechanism including a lever for connection with a clutch pedal and swingingly movable in an endwise direction for rocking the pedal, a coacting lever pivoted to swing against said first mentioned lever for swinging such lever, a flexible element connected with the latter lever for swinging the latter lever and arranged to exert an endwise thrust on said first mentioned lever, and means for operating said element.

7. A clutch actuating mechanism including a lever for connection with a clutch pedal, a coacting lever pivoted to swing against said first mentioned lever for rocking the pedal, a flexible element connected with the latter lever for swinging the latter lever and arranged to extend across the free end of said first mentioned lever for exerting a thrust thereon tending to swing said first mentioned lever, and means for operating said element.

8. A clutch actuating mechanism including a lever for connection with a clutch pedal, a coacting lever pivoted to swing against said first mentioned lever, a flexible element coacting between the levers whereby pull upon said element tending to straighten the element will serve to swing both levers and rock the pedal, and means for exerting a pulling strain on said element.

9. A clutch actuating mechanism including a lever for connection with a clutch pedal, a coacting lever pivoted to swing against said first mentioned lever for swinging such lever and rocking the pedal, the levers normally having their free ends presented in opposite directions, a flexible element arranged to coact with the free end of said first mentioned lever and connected with the free end of said second mentioned lever whereby pull upon said element will tend to move the levers in opposite directions and rock the pedal, and means for exerting a pulling strain on said element.

10. A clutch actuating mechanism including a lever for connection with a clutch pedal, a bracket, a bracket plate adjustable upon the bracket, a coacting lever pivoted upon said plate to swing against said first mentioned lever for rocking the pedal, and means for swinging the latter lever.

11. A clutch actuating mechanism including a lever for connection with a clutch pedal, a bracket, a post upstanding from the bracket, a pivoted lever carried by the bracket to swing downwardly against said first mentioned lever for rocking the pedal, means adjustable upon the post for limiting the latter lever in its upward movement, and means for swinging the latter lever.

12. A clutch actuating mechanism including a lever for connection with a clutch pedal and provided at its free end with a pulley, a coacting lever pivoted to swing against said first mentioned lever and provided at its free end with a roller to travel against the former lever, a flexible element trained over said pulley and connected with the free end portion of the latter lever whereby pull upon said element will serve to swing both levers and rock the pedal, and means for exerting a pulling strain on said element.

In testimony whereof I affix my signature.

JESSE J. MORSCH. [L. S.]